(12) United States Patent
Vroblesky

(10) Patent No.: US 7,757,757 B1
(45) Date of Patent: Jul. 20, 2010

(54) IN-WELL BAFFLE APPARATUS AND METHOD

(75) Inventor: Don A. Vroblesky, Columbia, SC (US)

(73) Assignee: The United States of America as represented by the Secretary of the Interior, Washington, DC (US)

( * ) Notice: Subject to any disclaimer, the term of this patent is extended or adjusted under 35 U.S.C. 154(b) by 94 days.

(21) Appl. No.: 12/042,029

(22) Filed: Mar. 4, 2008

Related U.S. Application Data

(60) Provisional application No. 60/909,573, filed on Apr. 2, 2007.

(51) Int. Cl.
*E21B 33/12* (2006.01)

(52) U.S. Cl. ...................................... 166/192

(58) Field of Classification Search ................ 166/192, 166/386, 162, 177.3
See application file for complete search history.

(56) References Cited

U.S. PATENT DOCUMENTS

| | | | | | |
|---|---|---|---|---|---|
| 1,732,277 | A | * | 10/1929 | Owens | 15/104.16 |
| 2,514,817 | A | * | 7/1950 | Wheaton et al. | 15/220.4 |
| 2,559,782 | A | * | 7/1951 | Meek | 15/220.4 |
| 2,785,757 | A | * | 3/1957 | Middleton | 166/170 |
| 2,999,545 | A | * | 9/1961 | Bigelow | 166/153 |
| 3,572,433 | A | * | 3/1971 | Conrad | 66/132 |
| 3,706,342 | A | * | 12/1972 | Woolley | 277/340 |
| 3,891,034 | A | * | 6/1975 | Owen et al. | 166/285 |
| 4,356,865 | A | * | 11/1982 | Appel et al. | 166/153 |
| 4,491,178 | A | * | 1/1985 | Terrell et al. | 166/192 |
| 4,603,737 | A | * | 8/1986 | Spikes | 166/241.7 |
| 4,706,747 | A | * | 11/1987 | Schneider | 166/153 |
| 4,715,443 | A | | 12/1987 | Gidley | |
| 5,667,015 | A | * | 9/1997 | Harestad et al. | 166/383 |
| 5,732,774 | A | * | 3/1998 | Haggard | 166/153 |
| 5,921,320 | A | * | 7/1999 | Shulyatikov et al. | 166/372 |
| 6,050,336 | A | * | 4/2000 | Willauer et al. | 166/286 |
| 6,371,207 | B1 | * | 4/2002 | Reynolds | 166/312 |
| 6,431,272 | B1 | * | 8/2002 | Pratt | 166/162 |
| 6,835,307 | B2 | | 12/2004 | Talbert et al. | |
| 6,901,999 | B2 | * | 6/2005 | Sugden | 166/105.1 |
| 7,124,816 | B2 | * | 10/2006 | Årebrat | 166/192 |
| 7,143,829 | B2 | * | 12/2006 | Booth | 166/311 |
| 2004/0168806 | A1 | * | 9/2004 | Booth | 166/311 |
| 2004/0194970 | A1 | * | 10/2004 | Eatwell et al. | 166/387 |

OTHER PUBLICATIONS

Schlumberger, Oilfield Glossary entry for "Hydrogen sulfide", Mar. 1, 2004, accessed Dec. 3, 2009 via the Internet Archive "Wayback Machine" http://www.archive.org/web/web.php.*

(Continued)

*Primary Examiner*—Daniel P Stephenson
*Assistant Examiner*—Blake Michener
(74) *Attorney, Agent, or Firm*—Joan Gilsdorf

(57) ABSTRACT

A baffle apparatus and method for use in a well to mitigate convective in-well flow. The baffle apparatus includes a baffle member attached to a rod. The baffle member prevents vertical flow of water in the well after the baffle apparatus is deployed in the well. At least one centralizer is attached to the rod to maintain correct orientation of the baffle member within the well. The baffle member and the at least one centralizer allow well water to pass during deployment and recovery of the baffle apparatus.

13 Claims, 5 Drawing Sheets

OTHER PUBLICATIONS

Vroblesky et al., "Influence of In-Well Convection on Well Sampling," USGS Scientific Investigations Report 2006-5247, 2006, 21 pp., <http://pubs.usgs.gov/sir/2006/5247/>.

USGS, "Vertical Flowmeter Logging," 7 pp. <http://water.usgs.gov/ogw/bgas/flowmeter/>.

Vroblesky et al., "Influence of Dissolved Oxygen Convection on Well Sampling," Ground Water Monitoring & Remediation, Summer 2007, pp. 49-58, v. 27, No. 3.

Johnson et al., "Evaluation of an Inexpensive Small-Diameter Temperature Logger for Documenting Ground Water-River Interactions," Ground Water Monitoring & Remediation, Fall 2005, pp. 68-74, v. 25, No. 4.

Ronen et al., "A Multi-Layer Sampler for the Study of Detailed Hydrochemical Profiles in Groundwater," Water Research, 1986, pp. 311-315, v. 20, No. 3.

Lobbe Umwelttechnik GMBH & Co. Product Information, "Passive Multi-Layer Sampler for Groundwater Sampling," 1995, 4 pp.

* cited by examiner

IN-WELL BAFFLE APPARATUS AND METHOD

CROSS-REFERENCE TO RELATED APPLICATION(S)

This application claims the benefit of U.S. Provisional Patent Application No. 60/909,573 filed Apr. 2, 2007 in the U.S. Patent and Trademark Office, the disclosure of which is incorporated herein by reference.

STATEMENT OF GOVERNMENT INTEREST

The invention described herein may be manufactured and used by or for the Government of the United States of America for government purposes without the payment of any royalties therefore.

BACKGROUND

1. Field of the Invention

The present invention relates in general to ground water sampling and, more particularly, to a baffle apparatus for use in wells.

2. Description of the Related Art

During the winter, the shallow water in wells cools. When the shallow water becomes cooler than the deeper water in the well, the well water "turns over" and begins a process of in-well convection that continues through the winter. The convection transports dissolved oxygen (DO) from the surface of the water column to deeper parts of the well. When the aquifer is anaerobic, the transport of DO to the screened interval can adversely affect the ability of passive samplers to produce accurate concentrations of oxygen-sensitive solutes, such as iron and other redox indicators and microbiological data. During low-flow sampling, the pumped water may be a mixture of convecting water from within the well casing and aquifer water moving inward through the screen. This mixing of water during low-flow sampling can substantially increase equilibration times of indicator parameters, cause false stabilization of indicator parameters, give false indications of the redox state, and provide microbiological data that are not representative of the aquifer conditions. In-well convection is described in more detail in "Influence of In-Well Convection on Well Sampling" by D. A. Vroblesky et al., *U.S. Geological Survey Scientific Investigations Report* 2006-5247, pp. 1-13, 2006, and in "Influence of Dissolved Oxygen Convection on Well Sampling" by Vroblesky, D. A., Casey, C. C., and Lowery, M. A., *Ground Water Monitoring and Remediation*, v. 27, no. 3, Summer 2007, pp. 49-58, both of which are incorporated herein by reference. Because this problem is likely to be widespread in a variety of climate regimes, there is a need for an inexpensive, simple device to mitigate in-well convection.

BRIEF SUMMARY OF THE INVENTION

The present disclosure describes a baffle apparatus and method for use in ground water monitoring wells that mitigates in-well convection to provide more reliable water samples. The baffle apparatus includes a baffle member and one or more centralizers attached to a rod. The baffle member includes multiple, flexible disks that prevent the vertical flow of water in the well after the baffle apparatus has been deployed. Each of the one or more centralizers includes a rigid disk that prevents the baffle member from tilting in the well so that convective well water cannot pass around the baffle member. The centralizers also have notches to reduce water entrapment when deploying or recovering the baffle apparatus.

The baffle disks are preferably slightly larger than the inner diameter of the well, while the centralizers are slightly smaller than the well inner diameter. During deployment and recovery, the flexible baffle disks allow the passage of water around the baffle member. The edges of the baffle disks bend slightly to cover the entire cross-sectional area of the well, which blocks vertical water flow after deployment. The centralizers are separated from one another a minimum distance of about 3.25 times the inner diameter of the well.

A water sample may be collected by attaching a water sampler below the baffle apparatus at the time of deployment. Alternatively, the rod may be a hollow pipe and a sample may be collected by using tubing extended from land surface through the pipe to the desired sampling depth, by extending the bottom of the pipe to the desired sampling depth and attaching tubing to the top of the pipe, or by elongating the pipe and collecting the sample through the pipe.

Various aspects and advantages of the invention will become apparent from the following detailed description, taken in conjunction with the accompanying drawings, which are not necessarily drawn to scale.

DETAILED DESCRIPTION OF THE PREFERRED EMBODIMENTS

The present disclosure describes a baffle apparatus and method that mitigate the adverse effects on sampling of in-well mixing of water due to diffusion and convection.

Figure 1:
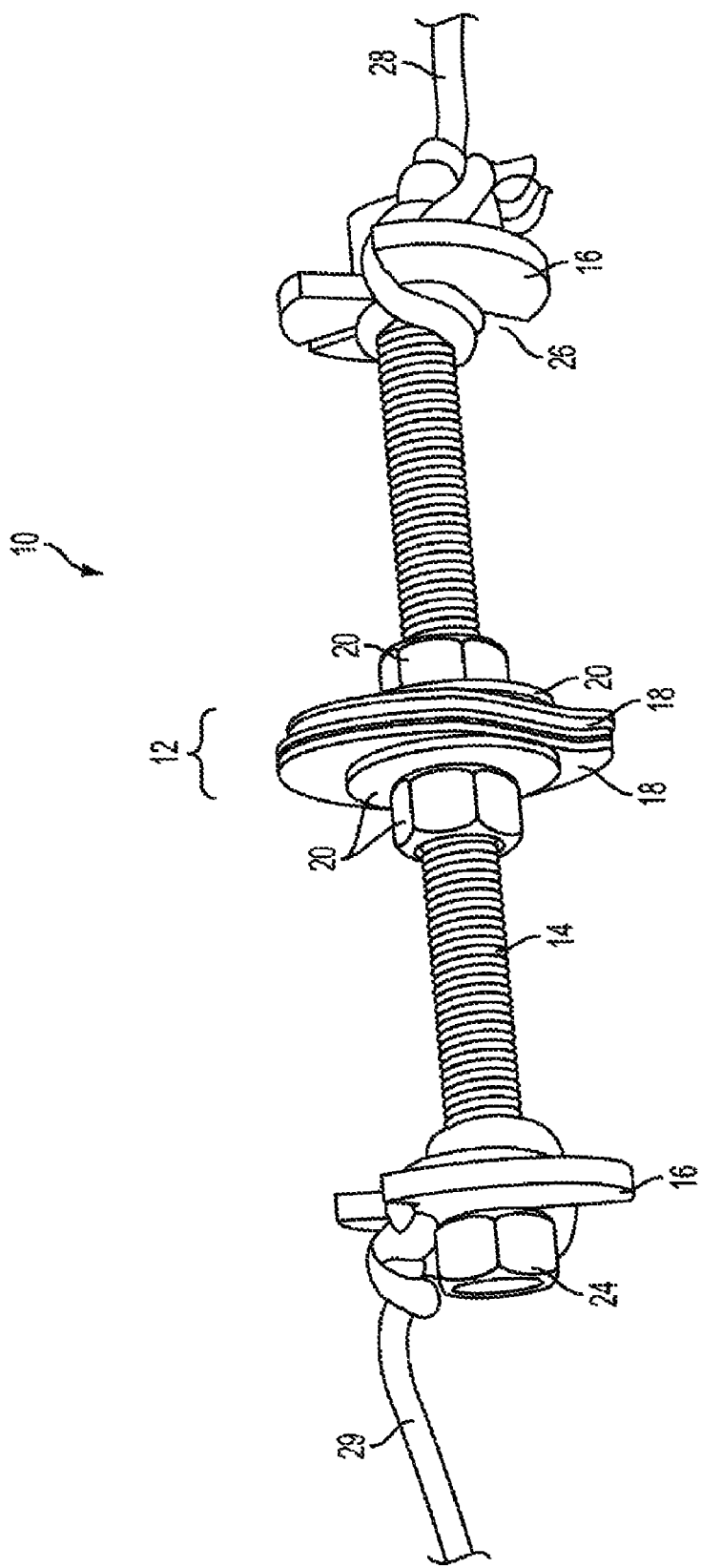
FIG. 1 illustrates a baffle apparatus, according to an embodiment of the invention.
Figure 2:
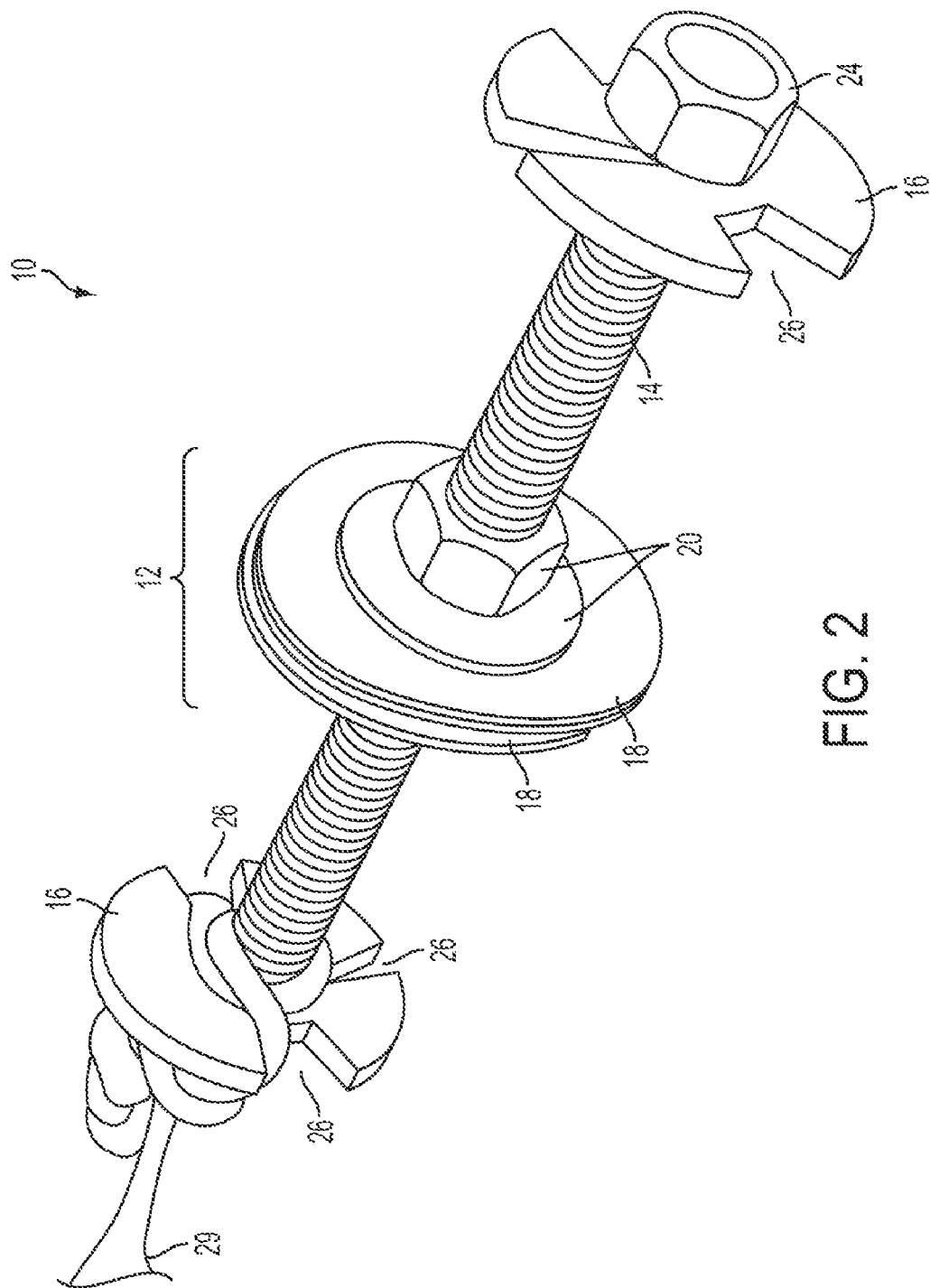
FIG. 2 is a perspective view of the baffle apparatus of FIG. 1.

The embodiment shown in FIGS. 1 and 2 illustrate a baffle apparatus 10 having a baffle member 12 centered on a rod 14. One or more centralizers 16 may be attached to the rod 14. Two centralizers 16, one at each end of the rod 14, are depicted in FIGS. 1 and 2. The baffle member 12 prevents vertical water movement in a well by covering the cross-sectional space of the well to form a seal. The centralizers 16 maintain the correct orientation of the baffle apparatus 10 by keeping the rod 14 vertical so that the baffle member 12 does not tilt and lose its seal.

The baffle member 12 has multiple, flexible baffle disks 18 made of polyethylene or other plastics or rubber materials. Typically, about two to about four baffle disks 18 are sufficient to block vertical water movement. Optionally, each baffle disk 18 may have one or more slits (not shown) to allow water movement during deployment and recovery. The baffle disks 18 with slits are rotated so that the slits do not align. The baffle disks 18 have center holes to receive the rod 14. The rod 14 may be solid or hollow. In the embodiment shown in FIGS. 1 and 2, the rod 14 is a solid, threaded rod and the baffle disks 18 are attached to the rod 14 using fasteners 20 such as nuts and washers, pins, etc.

Figure 3:
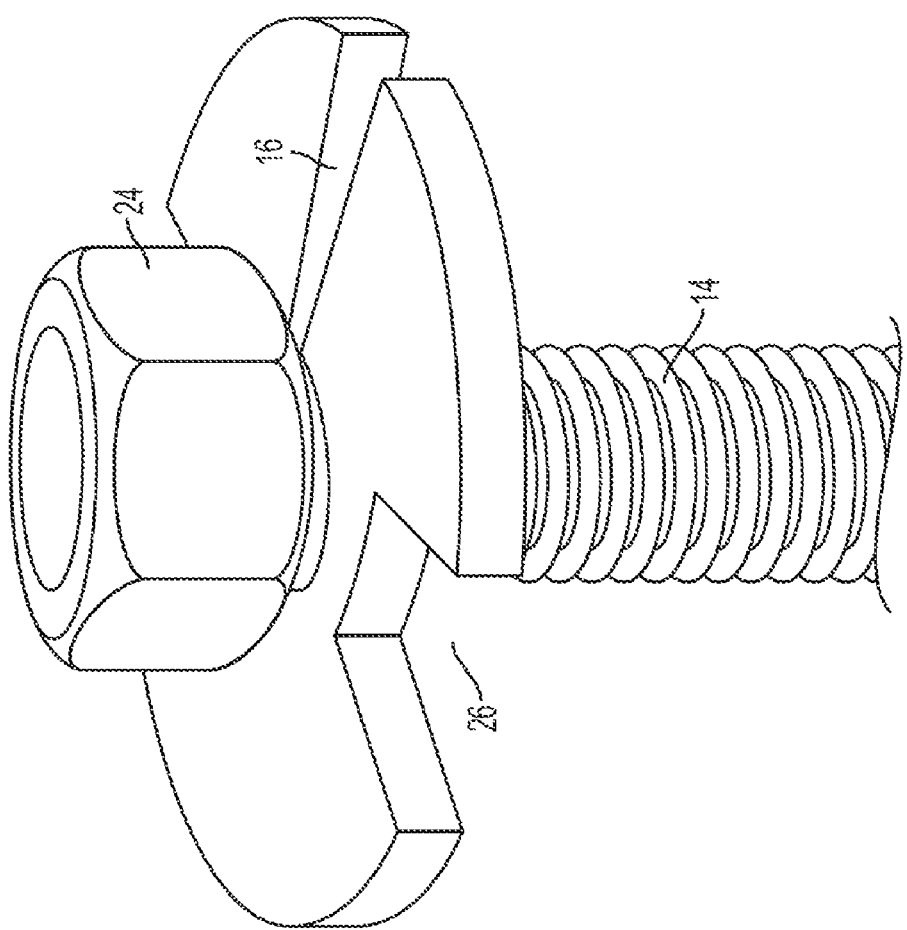
FIG. 3 illustrates a centralizer of the baffle apparatus shown in FIGS. 1 and 2.

The centralizers 16 are rigid disks made of plastic or metal, for example. The centralizers 16 are attached to the rod 14 (e.g., by being threaded onto the rod 14) and are held in place and prevented from being pulled off the rod 14 by using fasteners 24 such as nuts. A close-up view of one of the centralizers 16 is shown in FIG. 3. The centralizers 16 have one or more notches 26 (typically, about three notches 26 per centralizer 16) that allow water to pass through to reduce water entrapment when deploying or recovering the baffle apparatus 10. The notches 26 may also be used to facilitate the attachment of lines 28, 29 (e.g., ropes, cables, cords, etc.) to the baffle apparatus 10. The lines 28 are attached to the top end of the baffle apparatus 10 to lower the baffle apparatus 10 into the well and to pull it out of the well. The lines 29 are attached to the bottom end of the baffle apparatus 10 so that devices such as weights and water samplers may be deployed with the baffle apparatus 10. For shallow wells, an alternative for deployment is to extend the rod 14 to the well top, where the rod 14 is secured to prevent the baffle member 12 from tilting. This eliminates the need for the lines 28 above the baffle apparatus 10 and the need for more than one centralizer 16. An additional approach to deployment is to extend the rod 14 below the bottom centralizer 16 so that the rod 14 contacts the bottom of the well. This assures proper vertical placement of the baffle apparatus 10 with respect to the well screen.

The dimensions of the baffle apparatus 10 may vary according to the dimensions of the well. The baffle disks 18 have a diameter that is at least the same size as the inner diameter of the well. Preferably, the baffle disks 18 are slightly larger in diameter than the inner diameter of the well for better blockage of vertical water flow, and the centralizers 16 are slightly smaller than the well inner diameter for ease in deployment and recovery. When the baffle apparatus 10 is deployed with the baffle disks 18 having a diameter larger than the inner diameter of the well, the flexible baffle disks 18 bend slightly to cover the entire cross-sectional space of the well, which blocks vertical water flow once the baffle apparatus 10 is deployed.

In the embodiment of the apparatus shown in FIGS. 1 and 2, the baffle apparatus 10 is designed for a 2-inch inner-diameter well. The rod 14 is approximately 3/8-inch in diameter and approximately 7 inches in length. Three baffle disks 18 that are each approximately 2 1/8 inches in diameter are used in the embodiment shown in FIGS. 1 and 2, and the centralizers 16 are both approximately 1 7/8 inches in diameter. The thickness of the centralizers 16 may vary, as long as they are rigid. The thickness of the baffle disks 18 used in FIGS. 1 and 2 is about 1/16-inch, but greater thicknesses may be used as long as the baffle disks 18 remain flexible. The centralizers 16 are separated from each other by approximately 6.5 inches in FIGS. 1 and 2. In general, the centralizers 16 are separated from each other by a minimum distance of about 3.25 times the inner diameter of the well. A smaller separation distance may not prevent the baffle member 12 from tilting and leaking.

The materials used to construct the baffle apparatus 10 should not compromise the data-quality objectives of the well-sampling effort. Typical construction materials include plastics, such as polyethylene, polyurethane, Teflon®, and other non-metal materials. Metal, preferably stainless steel, can be used for components other than the baffle disks 18 when its presence will not compromise the water quality.

Figure 4:
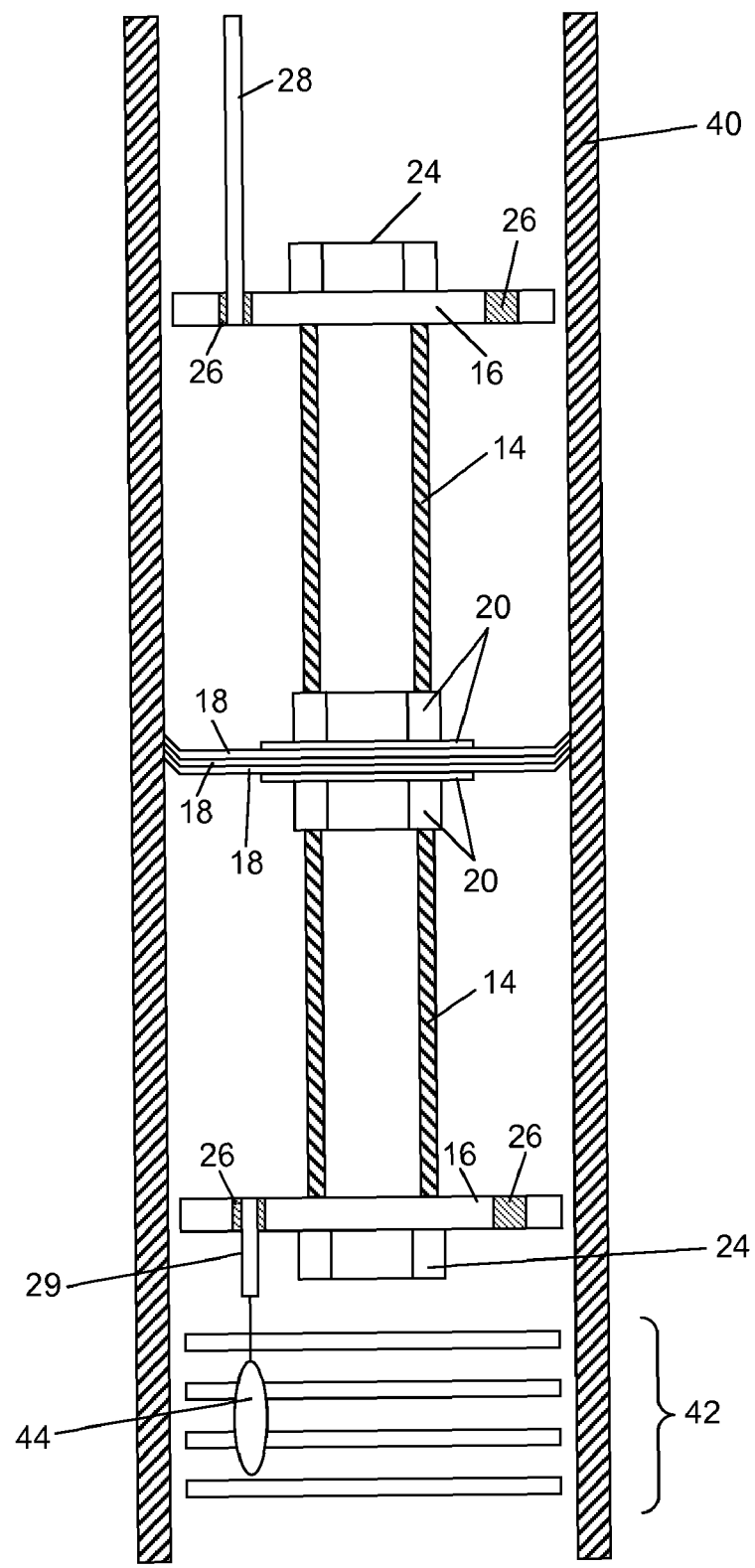
FIG. 4 illustrates collection of a water sample using a water sampler attached to the baffle apparatus of FIGS. 1 and 2.
Figure 5:
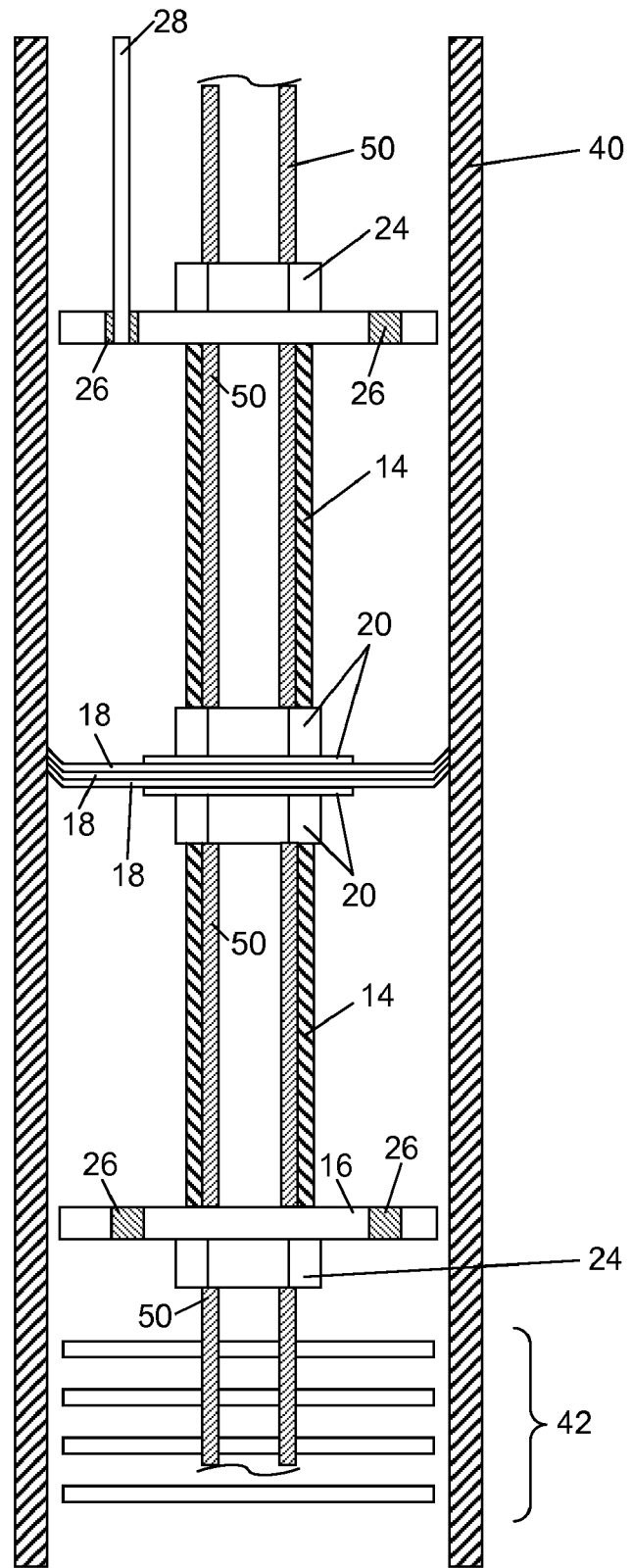
FIG. 5 illustrates collection of a water sample using tubing inserted through the baffle apparatus.

FIGS. 4 and 5 show the baffle apparatus 10 deployed in a portion of a well 40 with a well screen 42. In the embodiment shown in FIGS. 4 and 5, the baffle apparatus 10 is deployed in the well 40 by attaching a weight (not shown) to the bottom thereof and lowering the weight and the baffle apparatus 10 into the well 40 until the baffle member 12 is approximately 1 foot above the top of the well screen 42. A water sample may be collected below the baffle apparatus 10. For example, a sampler 44, such as a passive sampler, may be attached to the bottom of the baffle apparatus 10, as shown in FIG. 4. Both the sampler 44 and the weight may be attached to the same deployment line 29, or an additional deployment line (not shown) may be attached to the bottom of the baffle apparatus 10 so that the sampler 44 and the weight may be attached to different deployment lines. The sampler 44 and the baffle apparatus 10 are then deployed in the well 40 and allowed to equilibrate. After an equilibration period, the sampler 44 and the baffle apparatus 10 are removed from the well 40, and the sample is recovered from the sampler 44.

Alternatively, the rod 14 may be hollow to allow collection of a sample from below the baffle apparatus 10 without disturbing the baffle apparatus 10. Referring to FIG. 5, when using a hollow pipe as the rod 14, tubing 50 is extended from land surface through the pipe to the zone below the pipe, where it is attached to a pump (not shown) or left open and used to extract water by a pump, such as a vacuum pump (not shown), attached to the top of the tubing 50. The tubing 50 should tightly fit inside the pipe so that there is no annular space between the tubing 50 and the pipe. During the brief initial pumping period of water-level stabilization, water will move around the baffle apparatus 10. The baffle apparatus 10 will eliminate further influence of convection on the pumped sample after water-level stabilization. Another sampling alternative is to extend the pipe below the baffle apparatus 10 to the desired sampling depth, rather than forcing the tubing 50 through the pipe. In this way, there is no need to have the inner tubing 50 fit tightly within the pipe. Instead, the tubing 50 would merely attach (e.g., by pressure fit, quick connect, etc.) to the top of the pipe. Also, rather than using the tubing 50, the pipe may be extended to the well top so that the sample is collected through the elongated pipe.

The baffle apparatus described herein provides numerous benefits in the sampling of ground water in wells. For example, the baffle apparatus is small, lightweight, non-bulky, and can be easily lowered into the well by one person; with sufficient weight attached, it does not need to be pushed or forced into the well to the desired depth. It does not require inflation or tightening with screws to produce a seal. Also, deployment and recovery of the baffle apparatus is easy because the baffle disks are flexible and, thus, do not displace an inordinate amount of water. In addition, special tools and equipment, such as winches or inert gas, are not needed to deploy and recover the baffle apparatus. Finally, the baffle apparatus does not require attachment to an expensive device, such as a borehole flowmeter, to keep the baffle disks oriented horizontally across the well casing.

The present disclosure describes a baffle apparatus that is used to mitigate the adverse affects of in-well convective transport of oxygen during long-term monitoring of wells. The baffle apparatus provides a simple and inexpensive way to maintain proper baffle orientation, and can reduce costs associated with monitoring ground water contamination sites and improve the quality of well samples during winter months.

It will be appreciated by those skilled in the art that modifications and variations of the present invention are possible without departing from the principles and spirit of the invention, the scope of which is defined in the appended claims and their equivalents.

What is claimed is:

1. A baffle apparatus for use in a well, comprising:
   a rod;
   a baffle member attached to the rod;
   at least one centralizer attached to the rod to maintain a correct orientation of the baffle member within the well, the baffle member and the at least one centralizer allowing well water to pass therethrough during deployment and recovery of the baffle apparatus, the at least one centralizer having a plurality of notches therein to allow well water to pass therethrough; and a line attached to the top end of the at least one centralizer to lower the baffle apparatus into the well and pull it out of the well.

2. The baffle apparatus of claim 1, wherein the baffle member comprises a plurality of baffle disks, adjacent baffle disks contacting one another and each baffle disk having a center hole to receive the rod.

3. The baffle apparatus of claim 2, wherein the baffle disks are made of plastic.

4. The baffle apparatus of claim 2, wherein the baffle disks are made from a material selected from the group consisting of polyethylene, polyurethane, Teflon®, and rubber.

5. The baffle apparatus of claim 2, wherein the baffle disks have a diameter approximately the same size as an inner diameter of the well.

6. The baffle apparatus of claim 2, wherein the baffle disks have a diameter that is greater than an inner diameter of the well, the baffle disks being flexible and having outer edges that bend when contacting an inner wall of the well to cover a cross-sectional space of the well and block vertical flow of water in the well after the baffle apparatus is deployed, while allowing water to pass around the baffle member during deployment and recovery.

7. The baffle apparatus of claim 1, wherein the at least one centralizer comprises two centralizers, each centralizer being attached to respective ends of the rod and separated from each other a distance of at least about 3.25 times an inner diameter of the well, and wherein the baffle member is centered on the rod between the two centralizers.

8. The baffle apparatus of claim 1, wherein the at least one centralizer comprises a rigid disk made of plastic or metal.

9. The baffle apparatus of claim 1, wherein the at least one centralizer comprises a plurality of notches to allow water to pass therethrough when deploying and recovering the baffle apparatus from the well.

10. The baffle apparatus of claim 1, wherein the at least one centralizer has a diameter that is less than an inner diameter of the well and prevents the baffle member from tilting within the well by keeping the rod in a vertical position.

11. The baffle apparatus of claim 1, wherein the rod is a solid rod.

12. The baffle apparatus of claim 1, wherein the rod is a hollow pipe to facilitate collection of a water sample from below the baffle apparatus without removing the baffle apparatus from the well.

13. The baffle apparatus of claim 1, wherein the rod is made of stainless steel.

* * * * *